United States Patent Office 3,373,214
Patented Mar. 12, 1968

3,373,214
HIGH MOLECULAR WEIGHT COMPOUNDS CONTAINING AN ALIPHATIC-SUBSTITUTED BICYCLOHEPTANE STRUCTURE
Erich Marcus, Charleston, Donald L. MacPeek, South Charleston, and Samuel W. Tinsley, Charleston, W. Va., assignors to Union Carbide Corporation, a corporation of New York
No Drawing. Filed Jan. 17, 1966, Ser. No. 520,870
16 Claims. (Cl. 260—666)

This invention relates to the production of high molecular weight compounds containing an aliphatic-substituted bicycloheptane structure, including organoaluminum compounds, utilizing a lower molecular weight compound containing a bicycloheptene structure, an isoalkylaluminum compound, and ethylene.

In accordance with this invention, a relatively low molecular weight compound containing a bicycloheptene structure is initially reacted with an isoalkylaluminum compound so as to form a bicycloheptylaluminum compound. This reaction can be represented by the partial equation:

I

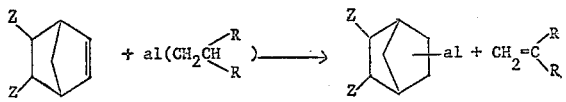

wherein each R, independently, designates an alkyl radical, preferably containing from 1 to 4 carbon atoms, each Z, when taken individually, designate hydrogen, and when taken collectively, designate the radical

II

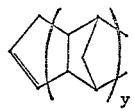

wherein y is an integer having a value of from 0 to 3.

It is to be noted that, as herein employed, the symbol "al" designates one-third of an atom of aluminum. Thus, in all instances, each aluminum atom is attached to three other atoms, as in tri(bicyclo[2.2.1]hept-2-yl)aluminum.

Suitable bicycloheptene compounds, i.e., compounds containing a bicycloheptene structure, which can be employed as a reactant include, by way of illustration, bicyclo[2.2.1]hept-2-ene itself, dicyclopentadiene, tricyclopentadiene, tetracyclopentadiene, and pentacyclopentadiene. The bicycloheptene type reactant can also be substituted on one or more ring carbon atoms by alkyl or cycloalkyl radicals as long as the two carbon atoms which together make up the double bond of the bicycloheptene ring remain unsubstituted so as to prevent steric hindrance.

The isoalkylaluminum compounds which can be reacted with the low molecular weight bicycloheptene compounds are the triisoalkylaluminums and diisoalkylaluminum hydrides represented by the formulas:

III

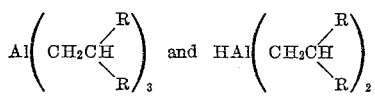

wherein R is as defined above. Suitable isoalkylaluminums include, by way of illustration, triisobutylaluminum, tri-2-methylbutylaluminum, tri-2-ethylhexylaluminum, diisobutylaluminum hydride, di-2-methylbutylaluminum hydride, di-2-ethylhexylaluminum hydride, and the like. The preferred isoalkylaluminum is triisobutylaluminum. Isoalkylaluminums containing two or three different isoalkyl radicals can also be employed as a reactant.

In producing the bicycloheptylaluminum compound, the proportion of bicycloheptene compound to isoalkylaluminum compound can vary, but preferably, a proportion of about 3 moles of bicycloheptene compound per mole of isoalkylaluminum compound is charged. In addition, when desired, an inert organic solvent can be incorporated in the reaction mixture. Suitable solvents include, for instance, heptane, octane, decane, benzene, toluene, xylene, decalin, and the like.

The reaction temperature can vary broadly in the range of from about 70° C. to about 200° C., substantially lower temperatures engendering an excessively slow rate of reaction, while at higher temperatures, undesirable side reactions may occur. Preferably, a reaction temperature of from about 90° C. to about 160° C. is employed. At such temperatures, the reaction is generally carried out for a period of from about 1 to about 10 hours. However, longer or shorter reaction periods sufficient to produce the desired polymer can also be employed.

It has also been found preferable, during the course of the reaction, to remove the isoolefin formed as a byproduct. Concordant therewith, the reaction can be carried out in an open system under atmospheric pressure, or in a closed system under autogenous pressure, providing the system is equipped, in the latter instance, with means for venting or removing the by-product. The removal of by-product isoolefin serves to drive the reaction to completion and minimizes or eliminates side reactions between the isoolefin and the desired product.

The bicycloheptylaluminum compound thus obtained is ordinarily liquid at room temperature, and can be recovered from the reaction mixture upon removal of the more volatile components of the reaction mixture by distillation or evaporation, etc.

The bicycloheptylaluminum compound is then subjected to a "growth" process by reaction with ethylene in the absence of a catalyst, and preferably under pressure. This reaction can be represented by the partial equation:

IV

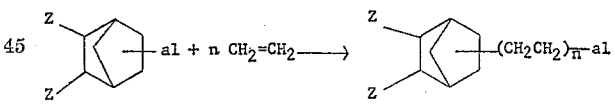

wherein Z is as defined above and $n$ is a positive integer equal to the number of moles of ethylene per bicycloheptylaluminum unit. Thus, in the "growth" process, ethylene units are inserted between aluminum atoms and adjacent carbon atoms. In addition, the "grown" product may contain bicycloheptylaluminum units which have not reacted with ethylene.

The amount of ethylene reacted should be sufficient to effect the "growth" of the bicycloheptylaluminum compound to the extent desired, as determined, for instance, by the subsequent use of the "grown" product. Useful products, by way of illustration, are those in which the bicycloheptylaluminum units have "grown" by an average varying chain length of from 2, and preferably from 6, to about 32 carbon atoms, i.e., wherein $n$ designates an integer having a value of from 1 to about 16. To this end, the bicycloheptylaluminum compound for which "growth" is desired is reacted with ethylene in a proportion of at least 1 mole, and preferably from about 3 moles, to about 16 moles of ethylene per bicycloheptylaluminum unit, e.g., at least about 3 moles, and preferably from about 9 moles, to about 48 moles of ethylene per mole of tris(bicycloheptyl)aluminum compound. In practice, however, an excess over the required amount of ethylene is generally charged. If desired, an inert organic solvent such as those previously described in connection with Equation I can also be incorporated in the reaction mixture.

The reaction temperature for the "growth" process can vary broadly. Particularly good results can be obtained, for instance, in the range of from about 70° C. to about 200° C., substantially lower temperatures engendering an excessively slow rate of reaction, while at higher temperatures, undesirable side reactions may occur. More preferably, a reaction temperature of from about 80° C. to about 120° C. is employed, particularly in connection with a batch operation. At such temperatures, the reaction is generally carried out for a period of from about 5 to about 50 hours. However, longer or shorter reaction periods consistent with the production of the "grown" product can also be employed. Thus, for instance, the reaction can also be carried out continuously in a tubular reactor, at a temperature preferably of from about 120° C. to about 190° C., for very short contact periods. The amount of ethylene entering the product can be controlled in part by the control of temperature, reaction period, etc., and is readily determinable by one skilled in the art in light of this disclosure. Similarly, the reaction rate is controlled in part by the pressure, with pressures of from about 500 p.s.i. to about 5,000 p.s.i. being preferred.

After the desired amount of ethylene has been incorporated in the "grown" bicycloheptylalkylaluminum compound, as determined, for instance, by the moles of ethylene consumed, the system is vented so as to remove any excess ethylene. The "grown" product thus obtained, like its bicycloheptylaluminum compound precursor, is ordinarily liquid at room temperature, and can be recovered from the reaction mixture in any convenient manner, as for instance, by the techniques described above in connection with the recovery of the precursor.

The "grown" bicycloheptylalkylaluminum compound can be subjected to a "displacement" process by subsequent reaction with ethylene, preferably in the presence of an aluminum displacement catalyst and under pressure, to form an omega-alkenylbicycloheptyl derivative. This reaction with ethylene can be represented by the partial equation:

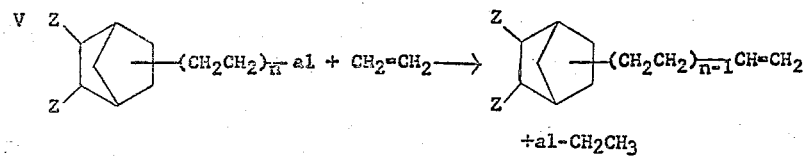

wherein Z and n are as defined above.

In the "displacement" process, the "grown" bicycloheptylalkylaluminum compound is reacted with ethylene in a proportion of at least 1 mole of ethylene per bicycloheptylalkylaluminum unit thereof, e.g., at least 3 moles of ethylene per mole of "grown" tris(bicycloheptylalkyl) aluminum compound. In practice, however, an excess over the required amount of ethylene is generally charged. If desired, an inert organic solvent such as those described above in connection with Equation I can also be incorporated in the reaction mixture. In addition, the presence of a small amount of an acetylenic compound, such as phenylacetylene, has been found to minimize the migration of double bonds in the product.

Suitable aluminum displacement catalysts are known in the art and include nickel, cobalt, and platinum. Such metals can be incorporated in the reaction mixture in elemental form, or preferably, as an inorganic or organic salt, such as nickel chloride, platinum chloride, cobalt chloride, nickel acetylacetonate, platinum acetylacetonate, cobalt acetylacetonate, and the like. The use of such salts ordinarily engenders a better dispersion of the metal in the reaction mixture. The catalyst is generally employed in a concentration of from about 0.0001 to about 1 percent by weight of metal based upon the weight of the polymer undergoing reaction, although higher or lower catalytic amounts can also be used. Preferably, the catalyst is employed in a concentration of from about 0.005 to about 0.1 percent by weight based in like manner.

The reaction temperature for the "displacement" process can also vary broadly, typically in the range of from about 25° C. to about 350° C. Particularly good results can be obtained in connection with a catalytic reaction in range of from about 25° C. to about 200° C. Here again, substantially lower temperatures engender an excessively slow reaction rate, while at higher temperatures, in the presence of the catalyst, undesirable side reactions may occur. The preferred catalytic reaction temperature is from about 40° C. to about 90° C. At such temperatures the reaction is generally carried out for a period of from about 1 to about 24 hours. However, longer or shorter reaction periods can also be employed. The "displacement" process can also be conducted omitting the use of a catalyst at substantially higher reaction temperatures of up to about 350° C. or slightly higher, and preferably from 250° C. to about 320° C. At such higher temperature, the reaction is best carried out continuously in a tubular reactor for short contact periods. As in the "growth" process, the reaction rate is controlled in part by the pressure, with pressures of from about 500 p.s.i. to about 5000 p.s.i. being preferred.

The product thus obtained is ordinarily liquid at room temperature and can be recovered from the reaction mixture by any of the conventional separation techniques described above. For instance, the product can be recovered as the residue obtained upon removal of the more volatile components of the reaction mixture by distillation. Alternatively, the reaction mixture can be hydrolyzed to assist the removal of alkylaluminum formed as a by-product. Hydrolysis can be effected by reaction with water, aqueous alcohol, and/or dilute acid. Upon hydrolysis, aluminum hydroxide is formed. The desired product can then be recovered by distillation of the organic phase of the reaction mixture. The removal of by-product alkylaluminum in this manner prevents the reversal of the "displacement" process which might otherwise occur upon distillation of the product.

Due to the nature of the bicycloheptylalkylaluminum compound employed as precursor, as described above, the product may comprise an isomeric mixture of omega-alkenylbicycloheptyl derivatives of statistically varying molecular weight (alkenyl chain length). Such mixtures can be resolved into components of narrow carbon content ranges by fractional distillation and the products isolated and analyzed by gas chromatography.

As typical of the omega-alkenylbicycloheptyl derivatives produced in accordance with this invention, there can be mentioned:

2-vinylbicyclo[2.2.1]heptane,
2-(3-butenyl)bicyclo[2.2.1]heptane,
2-(5-hexenyl)bicyclo[2.2.1]heptane,
2-(7-octenyl)bicyclo[2.2.1]heptane,
2-(9-decenyl)bicyclo[2.2.1]heptane,
2-(11-dodecenyl)bicyclo[2.2.1]heptane,
2-(13-tetradecenyl)bicyclo[2.2.1]heptane,
2-(15-hexadecenyl)bicyclo[2.2.1]heptane,
2-(17-octadecenyl)bicyclo[2.2.1]heptane,
2-(21-docosenyl)bicyclo[2.2.1]heptane,
2-(25-hexacosenyl)bicyclo[2.2.1]heptane,
2-(29-triacontenyl)bicyclo[2.2.1]heptane,
8-vinyltricyclo[5.2.1.0$^{2,6}$]dec-3-ene, 9-vinyltricyclo[5.2.1.0$^{2,6}$]dec-3-ene,
8-(3-butenyl)tricyclo[5.2.1.0$^{2,6}$]dec-3-ene,
9-(3-butenyl)tricyclo[5.2.1.0$^{2,6}$]dec-3-ene,
8-(5-hexenyl)tricyclo[5.2.1.0$^{2,6}$]dec-3-ene,
9-(5-hexenyl)tricyclo[2.2.1.0$^{2,6}$]dec-3-ene,
8-(7-octenyl)tricyclo[5.2.1.0$^{2,6}$]dec-3-ene,
9-(7-octenyl)tricyclo[5.2.1.0$^{2,6}$]dec-3-ene,
8-(9-decenyl)tricyclo[5.2.1.0$^{2,6}$]dec-3-ene,
9-(9-decenyl)tricyclo[5.2.1.0$^{2,6}$]dec-3-ene,
8-(11-dodecenyl)tricyclo[5.2.1.0$^{2,6}$]dec-3-ene,
9-(11-dodecenyl)tricyclo[5.2.1.0$^{2,6}$]dec-3-ene,
8-(13-tetradecenyl)tricyclo[5.2.1.0$^{2,6}$]dec-3-ene,
9-(13-tetradecenyl)tricyclo[5.2.1.0$^{2,6}$]dec-3-ene,
8-(15-hexadecenyl)tricyclo[5.2.1.0$^{2,6}$]dec-3-ene,
9-(15-hexadecenyl)tricyclo[5.2.1.0$^{2,6}$]dec-3-ene,
8-(17-octadecenyl)tricyclo[5.2.1.0$^{2,6}$]dec-3-ene,
9-(17-octadecenyl)tricyclo[5.2.1.0$^{2,6}$]dec-3-ene,
8-(19-eicosenyl)tricyclo[5.2.1.0$^{2,6}$]dec-3-ene,
9-(19-eicosenyl)tricyclo[5.2.1.0$^{2,6}$]dec-3-ene,
8-(23-tetracosenyl)tricyclo[5.2.1.0$^{2,6}$]dec-3-ene,
9-(23-tetracosenyl)tricyclo[5.2.1.0$^{2,6}$]dec-3-ene,
8-(27-octacosenyl)tricyclo[5.2.1.0$^{2,6}$]dec-3-ene,
9-(27-octacosenyl)tricyclo[5.2.1.0$^{2,6}$]dec-3-ene,
8-(31-dotriacontenyl)tricyclo[5.2.1.0$^{2,6}$]dec-3-ene,
9-(31-dotriacontenyl)tricyclo[5.2.1.0$^{2,6}$]dec-3-ene,
4-vinylpentacyclo[6.5.1.1$^{3,6}$0$^{2,7}$0$^{9,13}$]pentadec-10-ene,
5-vinylpentacyclo[6.5.1.1$^{3,6}$0$^{2,7}$0$^{9,13}$]pentadec-10-ene,
4-(3-butenyl)pentacyclo[6.5.1.1$^{3,6}$0$^{2,7}$0$^{9,13}$]pentadec-10-ene,
5-(3-butenyl)pentacyclo[6.5.1.1$^{3,6}$0$^{2,7}$0$^{9,13}$]pentadec-10-ene,
4-(5-hexenyl)pentacyclo[6.5.1.1$^{3,6}$0$^{2,7}$0$^{9,13}$]pentadec-10-ene,
5-(5-hexenyl)pentacyclo[6.5.1.1$^{3,6}$0$^{2,7}$0$^{9,13}$]pentadec-10-ene,
4-(7-octenyl)pentacyclo[6.5.1.1$^{3,6}$0$^{2,7}$0$^{9,13}$]pentadec-10-ene,
5-(7-octenyl)pentacyclo[6.5.1.1$^{3,6}$0$^{2,7}$0$^{9,13}$]pentadec-10-ene,
4-(9-decenyl)pentacyclo[6.5.1.1$^{3,6}$0$^{2,7}$0$^{9,13}$]pentadec-10-ene,
5-(9-decenyl)pentacyclo[6.5.1.1$^{3,6}$0$^{2,7}$0$^{9,13}$]pendadec-10-ene,
4-(11-dodecenyl)pentacyclo[6.5.1.1$^{3,6}$0$^{2,7}$0$^{9,13}$]pentadec-10-ene,
5-(11-dodecenyl)pentacyclo[6.5.1.1$^{3,6}$0$^{2,7}$0$^{9,13}$]pentadec-10-ene,
4-(13-tetradecenyl)pentacyclo[6.5.1.1$^{3,6}$0$^{2,7}$0$^{9,13}$]pentadec-10-ene,
5-(13-tetradecenyl)pentacyclo[6.5.1.1$^{3,6}$0$^{2,7}$0$^{9,13}$]pentadec-10-ene,
4-(15-hexadecenyl)pentacyclo[6.5.1.1$^{3,6}$0$^{2,7}$0$^{9,13}$]pentadec-10-ene,
5-(15-hexadecenyl)pentacyclo[6.5.1.1$^{3,6}$0$^{2,7}$0$^{9,13}$]pentadec-10-ene,
4-(17-octadecenyl)pentacyclo[6.5.1.1$^{3,6}$0$^{2,7}$0$^{9,13}$]pentadec-10-ene,
5-(17-octadecenyl)pentacyclo[6.5.1.1$^{3,6}$0$^{2,7}$0$^{9,13}$]pentadec-10-ene,
4-(21-docosenyl)pentacyclo[6.5.1.1$^{3,6}$0$^{2,7}$0$^{9,13}$]pentadec-10-ene,
5-(21-docosenyl)pentacyclo[6.5.1.1$^{3,6}$0$^{2,7}$0$^{9,13}$]pentadec-10-ene,
4-(25-hexacosenyl)pentacyclo[6.5.1.1$^{3,6}$0$^{2,7}$0$^{9,13}$]pentadec-10-ene,
5-(25-hexacosenyl)pentacyclo[6.5.1.1$^{3,6}$0$^{2,7}$0$^{9,13}$]pentadec-10-ene,
4-(29triacontenyl)pentacyclo[6.5.1.1$^{3,6}$0$^{2,7}$0$^{9,13}$]pentadec-10-ene,
5-(29-triacontenyl)pentacyclo[6.5.1.1$^{3,6}$0$^{2,7}$0$^{9,13}$]pentadec-10-ene,
14-vinylheptacyclo[9.6.1.1$^{3,9}$1$^{13,16}$0$^{4,8}$0$^{2,10}$0$^{12,17}$]eicos-5-ene,
15-vinylheptacyclo[9.6.1.1$^{3,9}$1$^{13,16}$0$^{4,8}$0$^{2,10}$0$^{12,17}$]eicos-5-ene,
14-(3-butenyl)heptacyclo[9.6.1.1$^{3,9}$1$^{13,16}$0$^{4,8}$0$^{2,10}$0$^{12,17}$]eicos-5-ene,
15-(3-butenyl)heptacyclo[9.6.1.1$^{3,9}$1$^{13,16}$0$^{4,8}$0$^{2,10}$0$^{12,17}$]eicos-5-ene,
14-(5-hexenyl)heptacyclo[9.6.1.1$^{3,9}$1$^{13,16}$0$^{4,8}$0$^{2,10}$0$^{12,17}$]eicos-5-ene,
15-(5-hexenyl)heptacyclo[9.6.1.1$^{3,9}$1$^{13,16}$0$^{2,10}$0$^{12,17}$]eicos-5-ene,
14-(9-decenyl)heptacyclo[9.6.1.1$^{3,9}$1$^{13}$0$^{4,8}$0$^{2,10}$0$^{12,17}$]eicos-5-ene,
14-(7-octenyl)heptacyclo[9.6.1.1$^{3,9}$1$^{13,16}$0$^{4,8}$0$^{2,10}$0$^{12,17}$]eicos-5-ene,
14-(9-decenyl)heptacyclo[9.6.1.1$^{3,9}$1$^{13,16}$0$^{4,8}$0$^{2,10}$0$^{12,17}$]eicos-5-ene,
15-(9-decenyl)heptacyclo[9.6.1.1$^{3,9}$1$^{13,16}$0$^{4,8}$0$^{2,10}$0$^{12,17}$]eicos-5-ene,
14-(11-dodecenyl)heptacyclo[9.6.1.1$^{3,9}$1$^{13,16}$0$^{4,8}$0$^{2,10}$0$^{12,17}$]eicos-5-ene,
15-(11-dodecenyl)heptacyclo[9.6.1.1$^{3,9}$1$^{13,16}$0$^{4,8}$0$^{2,10}$0$^{12,17}$]eicos-5-ene,
4-(3-tetradecenyl)heptacyclo[9.6.1.1$^{3,9}$1$^{13,16}$0$^{4,8}$0$^{2,10}$0$^{12,17}$]eicos-5-ene,
15-(13-tetradecenyl)heptacyclo[9.6.1.1$^{3,9}$1$^{13,16}$0$^{4,8}$0$^{2,10}$0$^{12,17}$]eicos-5-ene,
14-(15-hexadecenyl)heptacyclo[9.6.1.1$^{3,9}$1$^{13,16}$0$^{4,8}$0$^{2,10}$0$^{12,17}$]eicos-5-ene,
15-(15-hexadecenyl)heptacyclo[9.6.1.1$^{3,9}$1$^{13,16}$0$^{4,8}$0$^{2,10}$0$^{12,17}$]eicos-5-ene,
14-(17-octadecenyl)heptacyclo[9.6.1.1$^{3,9}$1$^{13,16}$0$^{4,8}$0$^{2,10}$0$^{17,17}$]eicos-5-ene,
15-(17-octadecenyl)heptacyclo[9.6.1.1$^{3,9}$1$^{13,16}$0$^{4,8}$0$^{2,10}$0$^{12,17}$]eicos-5-ene,
14-(19-eicosenyl)heptacyclo[9.6.1.1$^{3,9}$1$^{13,16}$0$^{4,8}$0$^{2,10}$0$^{12,17}$]eicos-5-ene,
15-(19-eicosenyl)heptacyclo[9.6.1.1$^{3,9}$1$^{13,16}$0$^{4,8}$0$^{2,10}$0$^{12,17}$]eicos-5-ene,
14-(23-tetracosenyl)heptacyclo[9.6.1.1$^{3,9}$1$^{13,16}$0$^{4,8}$0$^{2,10}$0$^{12,17}$]eicos-5-ene,
15-(23-tetracosenyl)heptacyclo[9.6.1.1$^{3,9}$1$^{13,16}$0$^{4,8}$0$^{2,10}$0$^{12,17}$]eicos-5-ene,
14-(27-octacosenyl)heptacyclo[9.6.1.1$^{3,9}$1$^{13,16}$0$^{4,8}$0$^{2,10}$0$^{12,17}$]eicos-5-ene,
15-(27-octacosenyl)heptacyclo[9.6.1.1$^{3,9}$1$^{13,16}$0$^{4,8}$0$^{2,10}$0$^{12,17}$]eicos-5-ene,
14-(31-dotriacontenyl)heptacyclo[9.6.1.1$^{3,9}$1$^{13,16}$0$^{4,8}$0$^{2,10}$0$^{12,17}$]eicos-5-ene,
15-(31-dotriacontenyl)heptacyclo[9.6.1.1$^{3,9}$1$^{13,16}$0$^{4,8}$0$^{2,10}$0$^{12,17}$]eicos-5-ene,
6-vinylnonacyclo[10.9.1.1$^{5,8}$1$^{3,10}$1$^{14,20}$0$^{4,9}$0$^{2,11}$0$^{13,21}$0$^{15,19}$]pentacos-16-ene,
7-vinylnonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(3-butenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(3-butenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(5-hexenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(5-hexenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(7-octenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(7-octenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(9-decenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(9-decenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6(11-dodecenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(11-dodecenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(13-tetradecenyl)nonacyclo[10.9.1.1$^{5,8}$1$^{3,10}$1$^{14,20}$0$^{4,9}$0$^{2,11}$0$^{13,21}$0$^{15,19}$]pentacos-16-ene, 7-(13-tetradecenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
6-(15-hexadecenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
7-(15-hexadecenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
6-(17-octadecenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
7-(17-octadecenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
6-(21-docosenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
7-(21-docosenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
6-(25-hexacosenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
7-(25-hexacosenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
6-(29-triacontenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene,
7-(29-triacontenyl)nonacyclo[10.9.1.1$^{5,8}$1$^{3,10}$1$^{14,20}$0$^{4,9}$0$^{2,11}$ 0$^{13,21}$0$^{15,19}$]pentacos-16-ene, and the like The omega-alkenylbicycloheptyl derivatives can subsequently be polymerized in accordance with conventional processes for the polymerization of olefinically unsaturated compounds to produce useful polymers. These compounds can also be reacted in accordance with conventional processes for the epoxidation of olefinically unsaturated compounds to produce the vicinal mono- and diepoxides represented by the formulas:

VI

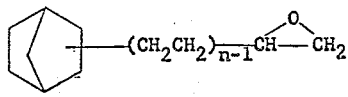

VII

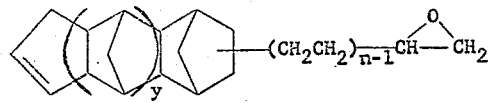

VIII

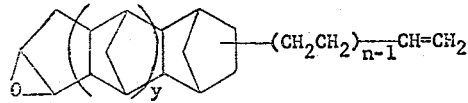

IX

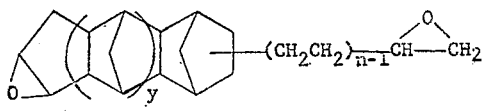

wherein $n$ and $y$ are as defined above.

The formation of a mono- or diepoxide will depend, in addition to the number of unsaturated groups present in the omega-alkenylbicycloheptyl compound, for the most part, upon the amount of epoxidizing agent employed, and is readily determinable by one skilled in the art in light of this disclosure. It is to be noted that the reaction of the omega-alkenylbicycloheptyl compound with an amount of epoxidizing agent sufficient to produce a monoepoxide will generally result in the epoxidation of the unsaturated group in the ring rather than the omega-alkenyl radical. Mixtures of mono- and diepoxides may also be produced depending, for instance, upon the amount of epoxidizing agent employed.

The epoxidation of the omega-alkenylbicycloheptyl compound can be carried out by reaction with peracetic acid or other conventional epoxidizing agent, in a suitable solvent such as ethyl acetate, if desired, and at a temperature which can vary broadly in the range of from about −25° C. to about 150° C. Preferably, reaction temperatures of from about 10° C. to about 90° C. are employed. At such temperatures, a reaction period of from about 1 to about 10 hours is usually sufficient for a complete reaction. However, longer or shorter reaction periods consistent with epoxide formation can also be employed.

The epoxide product can then be recovered from the reaction mixture in any convenient manner. For instance, the epoxide product can be recovered as the residue obtained upon removal of the more volatile components of the reaction mixture by distillation or evaporation, and resolved, if desired, by further distillation when more than one epoxide is product.

As typical of the epoxides produced in accordance with the invention, there can be mentioned:

2-epoxyethylbicyclo[2.2.1]heptane,
2-(3,4-epoxybutyl)bicyclo[2.2.1]heptane,
2-(5,6-epoxyhexyl)bicyclo[2.2.1]heptane,
2-(7,8-epoxyoctyl)bicyclo[2.2.1]heptane,
2-(9,10-epoxydecyl)bicyclo[2.2.1]heptane,
2-(11,12-epoxydodecyl)bicyclo[2.2.1]heptane,
2-(13,14-epoxytetradecyl)bicyclo[2.2.1]heptane,
2-(15,16-epoxyhexadecyl)bicyclo[2.2.1]heptane,
2-(17,18-epoxyoctadecyl)bicyclo[2.2.1]heptane,
2-(21,22-epoxydocosyl)bicyclo[2.2.1]heptane,
2-(25,26-epoxyhexacosyl)bicyclo[2.2.1]heptane,
2-(29,30-epoxytriacontyl)bicyclo[2.2.1]heptane,
8-epoxyethyltricyclo[5.2.1.0$^{2,6}$]dec-3-ene,
9-epoxyethyltricyclo[5.2.1.0$^{2,6}$]dec-3-ene,
8-(3,4-epoxybutyl)tricyclo[5.2.1.0$^{2,6}$]dec-3-ene,
9-(3,4-epoxybutyl)tricyclo[5.2.1.0$^{2,6}$]dec-3-ene,
8-(5,6-epoxyhexyl)tricyclo[5.2.1.0$^{2,6}$]dec-3-ene,
9-(5,6-epoxyhexyl)tricyclo[5.2.1.0$^{2,6}$]dec-3-ene,
8-(7,8-epoxyoctyl)tricyclo[5.2.1.0$^{2,6}$]dec-3-ene,
9-(7,8-epoxyoctyl)tricyclo[5.2.1.0$^{2,6}$]dec-3-ene,
8-(9,10-epoxydecyl)tricyclo[5.2.1.0$^{2,6}$]dec-3-ene,
9-(9,10-epoxydecyl)tricyclo[5.2.1.0$^{2,6}$]dec-3-ene,
8-(11,12-epoxydodecyl)tricyclo[5.2.1.0$^{2,6}$]dec-3-ene,
9-(11,12-epoxydodecyl)tricyclo[5.2.1.0$^{2,6}$]dec-3-ene,
8-(13,14-epoxytetradecyl)tricyclo[5.2.1.0$^{2,6}$]dec-3-ene,
9-(13,14-epoxytetradecyl)tricyclo[5.2.1.0$^{2,6}$]dec-3-ene,
8-(15,16-epoxyhexadecyl)tricyclo[5.2.1.0$^{2,6}$]dec-3-ene,
9-(15,16-epoxyhexadecyl)tricyclo[5.2.1.0$^{2,6}$]dec-3-ene,
8-(17,18-epoxyoctadecyl)tricyclo[5.2.1.0$^{2,6}$]dec-3-ene,
9-(17,18-epoxyoctadecyl)tricyclo[5.2.1.0$^{2,6}$]dec-3-ene,
8-(19,20-epoxycosyl)tricyclo[5.2.1.0$^{2,6}$]dec-3-ene,
9-(19,20-epoxycosyl)tricyclo[5.2.1.0$^{2,6}$]dec-3-ene,
8-(23,24-epoxytetracosyl)tricyclo[5.2.1.0$^{2,6}$]dec-3-ene,
9-(23,24-epoxytetracosyl)tricyclo[5.2.1.0$^{2,6}$]dec-3-ene,
8-(27,28-epoxyoctacosyl)tricyclo[5.2.1.0$^{2,6}$]dec-3-ene,
9-(27,28-epoxyoctacosyl)tricyclo[5.2.1.0$^{2,6}$]dec-3-ene,
8-(31,32-epoxydotriacontyl)tricyclo[5.2.1.0$^{2,6}$]dec-3-ene,
9-(31,32-epoxydotriacontyl)tricyclo[5.2.1.0$^{2,6}$]dec-3-ene,
3,4-epoxy-8-vinyltricyclo[5.2.1.0$^{2,6}$]decane,
3,4-epoxy-9-vinyltricyclo[5.2.1.0$^{2,6}$]decane,
3,4-epoxy-8-(3-butenyl)tricyclo[5.2.1.0$^{2,6}$]decane,
3,4-epoxy-9-(3-butenyl)tricyclo[5.2.1.0$^{2,6}$]decane,
3,4-epoxy-8-(5-hexenyl)tricyclo[5.2.1.0$^{2,6}$]decane,
3,4-epoxy-9-(5-hexenyl)tricyclo[5.2.1.0$^{2,6}$]decane,
3,4-epoxy-8-(7-octenyl)tricyclo[5.2.1.0$^{2,6}$]decane,
3,4-epoxy-9-(7-octenyl)tricyclo[5.2.1.0$^{2,6}$]decane,
3,4-epoxy-8-(9-decenyl)tricyclo[5.2.1.0$^{2,6}$]decane,
3,4-epoxy-9-(9-decenyl)tricyclo[5.2.1.0$^{2,6}$]decane,
3,4-epoxy-8-(11-dodecenyl)tricyclo[5.2.1.0$^{2,6}$]decane,
3,4-epoxy-9-(11-dodecenyl)tricyclo[5.2.1.0$^{2,6}$]decane,
3,4-epoxy-8-(13-tetradecenyl)tricyclo[5.2.1.0$^{2,6}$]decane,
3,4-epoxy-9-(13-tetradecenyl)tricyclo[5.2.1.0$^{2,6}$]decane, 3,4-epoxy-8-(15-hexadecenyl)tricyclo[5.2.1.0$^{2,6}$]decane,
3,4-epoxy-9-(15-hexadecenyl)tricyclo[5.2.1.0$^{2,6}$]decane,
3,4-epoxy-8-(17-octadecenyl)tricyclo[5.2.1.0$^{2,6}$]decane,
3,4-epoxy-9-(17-octadecenyl)tricyclo[5.2.1.0$^{2,6}$]decane,
3,4-epoxy-8-(19-eicosenyl)tricyclo[5.2.1.0$^{2,6}$]decane,
3,4-epoxy-9-(19-eicosenyl)tricyclo[5.2.1.0$^{2,6}$]]decane,
3,4-epoxy-8-(23-tetracosenyl)tricyclo[5.2.1.0$^{2,6}$]decane,
3,4-epoxy-9-(23-tetracosenyl)tricyclo[5.2.10$^{2,6}$]decane,
3,4-epoxy-8-(27-octacosenyl)tricyclo[5.2.1.0$^{2,6}$]decane,
3,4-epoxy-9-(27-octacosenyl)tricyclo[5.2.1.0$^{2,6}$]decane,
3,4-epoxy-8-(31-dotriacontenyl)tricyclo[5.2.1.0$^{2,6}$]decane,
3,4-epoxy-9-(31-dotriacontenyl)tricyclo[5.2.1.0$^{2,6}$]decane,
3,4-epoxy-8-epoxyethyltricyclo[5.2.1.0$^{2,6}$]decane,
3,4-epoxy-9-epoxyethyltricyclo[5.2.1.0$^{2,6}$]decane,
3,4-epoxy-8-(3,4-epoxybutyl)tricyclo[5.2.1.0$^{2,6}$]decane,
3,4-epoxy-9-(3,4-epoxybutyl)tricyclo[5.2.1.0$^{2,6}$]decane,
3,4-epoxy-8-(5,6-epoxyhexyl)tricyclo[5.2.1.0$^{2,6}$]decane,
3,4-epoxy-9-(5,6-epoxyhexyl)tricyclo[5.2.1.0$^{2,6}$]decane,
3,4-epoxy-8-(7,8-epoxyoctyl)tricyclo[5.2.1.0$^{2,6}$]decane,
3,4-epoxy-9-(7,8-epoxyoctyl)tricyclo[5.2.1.0$^{2,6}$]decane,
3,4-epoxy-8-(9,10-epoxydecyl)tricyclo[5.2.1.0$^{2,6}$]decane,
3,4-epoxy-9-(9,10-epoxydecyl)tricyclo[5.2.1.0$^{2,6}$]decane,
3,4-epoxy-8-(11,12-epoxydodecyl)tricyclo[5.2.1.0$^{2,6}$]decane,
3,4-epoxy-9-(11,12-epoxydodecyl)tricyclo[5.2.1.0$^{2,6}$]decane,
3,4-epoxy-8-(13,14-epoxytetradecyl)tricyclo[5.2.1.0$^{2,6}$]decane,
3,4-epoxy-9-(13,14-epoxytetradecyl)tricyclo[5.2.1.0$^{2,6}$]decane,
3,4-epoxy-8-(15,16-epoxyhexadecyl)tricyclo[5.2.1.0$^{2,6}$]decane,
3,4-epoxy-9-(15,16-epoxyhexadecyl)tricyclo[5.2.1.0$^{2,6}$]decane,
3,4-epoxy-8-(17,18-epoxyoctadecyl)tricyclo[5.2.1.0$^{2,6}$]decane,
3,4-epoxy-9-(17,18-epoxyoctadecyl)tricyclo[5.2.1.0$^{2,6}$]decane,
3,4-epoxy-8-(19,20-epoxyeicosyl)tricyclo[5.2.1.0$^{2,6}$]decane,
3,4-epoxy-9-(19,20-epoxyeicosyl)tricyclo[5.2.1.0$^{2,6}$]decane,
3,4-epoxy-8-(23,24-epoxytetracosyl)tricyclo[5.2.1.0$^{2,6}$]decane,
3,4-epoxy-9-(23,24-epoxytetracosyl)tricyclo[5.2.1.0$^{2,6}$]decane,
3,4-epoxy-8-(27,28-epoxyoctacosyl)tricyclo[5.2.1.0$^{2,6}$]decane,
3,4-epoxy-9-(27,28-epoxyoctacosyl)tricyclo[5.2.1.0$^{2,6}$]decane,
3,4-epoxy-8-(31,32-epoxydotriacontyl)tricyclo[5.2.1.0$^{2,6}$]decane,
3,4-epoxy-9-(31,32-epoxydotriacontyl)tricyclo[5.2.1.0$^{2,6}$]decane, and the like.

Similar epoxides corresponding to Formulas VII, VIII, and IX above where y is an integer having a value of from 1 to 3 (i.e. derived from tricyclopentadiene, tetracyclopentadiene, and pentacyclopentadiene), can also be obtained.

The epoxides produced in accordance with this invention can be reacted with organic hardeners such as polycarboxylic acids or anhydrides, polyamines, or polyols to produce curable resins having a wide variety of uses, particularly as molded articles. The resins thus obtained from the epoxides of this invention, particularly the diepoxides, may be characterized by enhanced impact strength and thermal shock resistance. The diepoxides of this invention can also be employed as plasticizers for vinyl resins. The unsaturated monoepoxides of this invention, on the other hand, can be copolymerized with conventional vinyl monomers to produce resins having enhanced heat and/or light stability.

The diepoxides can also be reacted with hydrogen in accordance with conventional processes for the reduction of epoxides to produce the omega-hydroxyalkylbicycloheptol derivatives represented by the formulas:

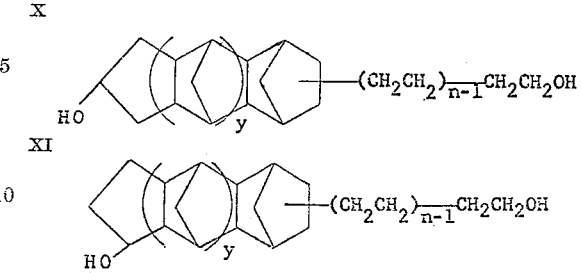

wherein $n$ and $y$ are as defined above.

The reduction of the diepoxide can be carried out by reaction with hydrogen under pressure in the presence of a hydrogenation catalyst such as Raney nickel or the like, and preferably in a sutiable inert solvent such as ethanol or heptanol, etc., at a temperature which can vary broadly in the range of from about 100° C. to about 300° C. Preferably, reaction temperatures of from about 120° C. to about 200° C. and pressures from about 400 p.s.i. to about 3,000 p.s.i. are employed. At such temperatures and pressures, a reaction period of from about 1 to about 10 hours is usually sufficient for a complete reaction. However, longer or shorter reaction periods can also be employed. The diol product can then be recovered and resolved, if necessary, in any convenient manner, as, for instance, by the conventional techniques described above.

As typical of the diols produced in accordance with this invention, there can be mentioned:

8-(2-hydroxyethyl)tricyclo[5.2.1.0$^{2,6}$]decan-4-ol,
9-(2-hydroxyethyl)tricyclo[5.2.1.0$^{2,6}$]decan-4-ol,
8-(2-hydroxyethyl)tricyclo[5.2.1.0$^{2,6}$]decan-3-ol,
9-(2-hydroxyethyl)tricyclo[5.2.1.0$^{2,6}$]decan-3-ol,
8-(4-hydroxybutyl)tricyclo[5.2.1.0$^{2,6}$]decan-4-ol,
9-(4-hydroxybutyl)tricyclo[5.2.1.0$^{2,6}$]decan-4-ol,
8-(4-hydroxybutyl)tricyclo[5.2.1.0$^{2,6}$]decan-3-ol,
9-(4-hydroxybutyl)tricyclo[5.2.1.0$^{2,6}$]decan-3-ol,
8-(6-hydroxyhexyl)tricyclo[5.2.1.0$^{2,6}$]decan-4-ol,
9-(6-hydroxyhexyl)tricyclo[5.2.1.0$^{2,6}$]decan-4-ol,
8-(6-hydroxyhexyl)tricyclo[5.2.1.0$^{2,6}$]decan-3-ol,
9-(6-hydroxyhexyl)tricyclo[5.2.1.0$^{2,6}$]decan-3-ol,
8-(8-hydroxyoctyl)tricyclo[5.2.1.0$^{2,6}$]decan-4-ol,
9-(8-hydroxyoctyl)tricyclo[5.2.1.0$^{2,6}$]decan-4-ol,
8-(8-hyroxyoctyl)tricyclo[5.2.1.0$^{2,6}$]decan-3-ol,
9-(8-hydroxyoctyl)tricyclo[5.2.1.0$^{2,6}$]decan-3-ol,
8-(10-hydroxydecyl)tricyclo[5.2.1.0$^{2,6}$]decan-4-ol,
9-(10-hydroxydecyl)tricyclo[5.2.1.0$^{2,6}$]decan-4-ol,
8-(10-hydroxydecyl)tricyclo[5.2.1.0$^{2,6}$]decan-3-ol,
9-(10-hydroxydecyl)tricyclo[5.2.1.0$^{2,6}$]decan-3-ol,
8-(12-hydroxydodecyl)tricyclo[5.2.1.0$^{2,6}$]decan-4-ol,
9-(12-hydroxydodecyl)tricyclo[5.2.1.0$^{2,6}$]decan-4-ol,
8-(12-hydroxydodecyl)tricyclo[5.2.1.0$^{2,6}$]decan-3-ol,
9-(12-hydroxydodecyl)tricyclo[5.2.1.0$^{2,6}$]decan-3-ol,
8-(14-hydroxytetradecyl)tricyclo[5.2.1.0$^{2,6}$]decan-4-ol,
9-(14-hydroxytetradecyl)tricyclo[5.2.1.0$^{2,6}$]decan-4-ol,
8-(14-hydroxytetradecyl)tricyclo[5.2.1.0$^{2,6}$]decan-3-ol,
9-(14-hydroxytetradecyl)tricyclo[5.2.1.0$^{2,6}$]decan-3-ol,
8-(16-hydroxyhexadecyl)tricyclo[5.2.1.0$^{2,6}$]decan-4-ol,
9-(16-hydroxyhexadecyl)tricyclo[5.2.1.0$^{2,6}$]decan-4-ol,
8-(16-hydroxyhexadecyl)tricyclo[5.2.1.0$^{2,6}$]decan-3-ol,
9-(16-hydroxyhexadecyl)tricyclo[5.2.1.0$^{2,6}$]decan-3-ol,
8-(18-hydroxyoctadecyl)tricyclo[5.2.1.0$^{2,6}$]decan-4-ol,
9-(18-hydroxyoctadecyl)tricyclo[5.2.1.0$^{2,6}$]decan-4-ol,
8-(18-hydroxyoctadecyl)tricyclo[5.2.1.0$^{2,6}$]decan-3-ol,
9-(18-hydroxyoctadecyl)tricyclo[5.2.1.0$^{2,6}$]decan-3-ol,
8-(20-hydroxyeicosyl)tricyclo[5.2.1.0$^{2,6}$]decan-4-ol,
9-(20-hydroxyeicosyl)tricyclo[5.2.1.0$^{2,6}$]decan-4-ol,
8-(20-hydroxyeicosyl)tricyclo[5.2.1.0$^{2,6}$]decan-3-ol,
9-(20-hydroxyeicosyl)tricyclo[5.2.1.0$^{2,6}$]decan-3-ol,
8-(24-hydroxytetracosyl)tricyclo[5.2.1.0$^{2,6}$]decan-4-ol,
9-(24-hydroxytetracosyl)tricyclo[5.2.1.0$^{2,6}$]decan-4-ol,
8-(24-hydroxytetracosyl)tricyclo[5.2.1.0$^{2,6}$]decan-3-ol, 9-(24-hydroxytetracosyl)tricyclo[5.2.1.0²,⁶]decan-3-ol,
8-(28-hydroxyoctacosyl)tricyclo[5.2.1.0²,⁶]decan-4-ol,
9-(28-hydroxyoctacosyl)tricyclo[5.2.1.0²,⁶]decan-4-ol,
8-(28-hydroxyoctacosyl)tricyclo[5.2.1.0²,⁶]decan-3-ol,
9-(28-hydroxyoctacosyl)tricyclo[5.2.1.0²,⁶]decan-3-ol,
8-(32-hydroxydotriacontyl)tricyclo[5.2.1.0²,⁶]decan-4-ol,
9-(32-hydroxydotriacontyl)tricyclo[5.2.1.0²,⁶]decan-4-ol,
8-(32-hydroxydotriacontyl)tricyclo[5.2.1.0²,⁶]decan-3-ol,
9-(32-hydroxydotriacontyl)tricyclo[5.2.1.0²,⁶]decan-3-ol,
and the like.

The "grown" bicycloheptylalkyaluminum compounds obtained in accordance with Equation IV can also be converted to omega-hydroxyalkylbicycloheptyl compounds represented by the formula:

XII

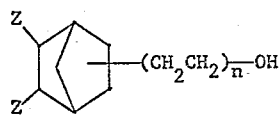

wherein Z and $n$ are as defined above, by contacting the "grown" bicycloheptylalkyaluminum compound at a temperature maintained in the range of from about 0° C. to about 150° C., and preferably from about 30° C. to about 60° C., with oxygen so as to insert an oxygen atom between each aluminum atom and the adjacent carbon atoms. Such contact can be effectel, for instance, by passing dry air or a nitrogen-oxygen mixture into a reaction mixture containing the "grown" bicycloheptyl-alkyl-aluminum compound. Since the reaction is exothermic, it may be desirable in certain instances to use a low concentration of oxygen at the beginning of the reaction and thereafter increase the oxygen concentration in the reactant gas stream as the rate of reaction decreases. Near the end of the reaction, pure oxygen can be used to insure completion. If desired, an inert organic solvent such as those described above in connection with the production of the bicycloheptylaluminum compound can also be incorporated in the reaction mixture.

After the oxygenation step, water or dilute acid is added to the reaction mixture to hydrolyze the oxygenated product to a hydroxyalkylbicycloheptyl compound. Water is preferred, as it readily hydrolyzes the oxygenated product, forming the hydroxyalkylbicycloheptyl compound and aluminum hydroxide as a by-product. Alternatively, the oxygenated product can be hydrolyzed by reaction with aqueous alcohol.

The hydroxyalkylbicycloheptyl compound thus obtained can be recovered from the reaction mixture in any convenient maner, as, for instance, by the conventional techniques described above. Here again, due to the nature of the bicycloheptylalkylaluminum compound employed as a precursor, the produce may comprise an isomeric mixture of hydroxyalkylbicycloheptyl compounds of statistically varying molecular weight (hydroxyalkyl chain length). Such mixture can also be resolved by the conventional techniques described above.

As typical of the omega-hydroxyalkylbicycloheptyl compounds produced in accordance with this invention, there can be mentioned:

2-(2-hydroxyethyl)bicyclo[2.2.1]heptane,
2-(4-hydroxybutyl)bicyclo[2.2.1]heptane,
2-(6-hydroxyhexyl)bicyclo[2.2.1]heptane,
2-(8-hydroxyoctyl)bicyclo[2.2.1]heptane,
2-(10-hydroxydecyl)bicyclo[2.2.1]heptane,
2-(12-hydroxydodecyl)bicyclo[2.2.1]heptane,
2-(14-hydroxytetradecyl)bicyclo[2.2.1]heptane,
2-(16-hydroxyhexadecyl)bicyclo[2.2.1]heptane,
2-(18-hydroxyoctadecyl)bicyclo[2.2.1]heptane,
2-(22-hydroxydocosyl)bicyclo[2.2.1]heptane,
2-(26-hydroxyhexacosyl)bicyclo[2.2.1]heptane,
2-(30-hydroxytriacontyl)bicyclo[2.2.1]heptane,
8-(2-hydroxyethyl)tricyclo[5.2.1.0²,⁶]dec-3-ene,
9-(2-hydroxyethyl)tricyclo[5.2.1.0²,⁶]dec-3-ene,
8-(4-hydroxybutyl)tricyclo[5.2.1.0²,⁶]dec-3-ene,
9-(4-hydroxybutyl)tricyclo[5.2.1.0²,⁶]dec-3-ene,
8-(6-hydroxyhexyl)tricyclo[5.2.1.0²,⁶]dec-3-ene,
9-(6-hydroxyhexyl)tricyclo[5.2.1.0²,⁶]dec-3-ene,
8-(8-hydroxyoctyl)tricyclo[5.2.1.0²,⁶]dec-3-ene,
9-(8-hydroxyoctyl)tricyclo[5.2.1.0²,⁶]dec-3-ene,
8-(10-hydroxydecyl)tricyclo[5.2.1.0²,⁶]dec-3-ene,
9-(10-hydroxydecyl)tricyclo[5.2.1.0²,⁶]dec-3-ene,
8-(12-hydroxydodecyl)tricyclo[5.2.1.0²,⁶]dec-3-ene,
9-(12-hydroxydodecyl)tricyclo[5.2.1.0²,⁶]dec-3-ene,
8-(14-hydroxytetradecyl)tricyclo[5.2.1.0²,⁶]dec-3-ene,
9-(14-hydroxytetradecyl)tricyclo[5.2.1.0²,⁶]dec-3-ene,
8-(16-hydroxyhexadecyl)tricyclo[5.2.1.0²,⁶]dec-3-ene,
9-(16-hydroxyhexadecyl)tricyclo[5.2.1.0²,⁶]dec-3-ene,
8-(18-hydroxyoctadecyl)tricyclo[5.2.1.0²,⁶]dec-3-ene,
9-(18-hydroxyoctadecyl)tricyclo[5.2.1.0²,⁶]dec-3-ene,
8-(22-hydroxydocosyl)tricyclo[5.2.1.0²,⁶]dec-3-ene,
9-(22-hydroxydocosyl)tricyclo[5.2.1.0²,⁶]dec-3-ene,
8-(26-hydroxyhexacosyl)tricyclo[5.2.1.0²,⁶]dec-3-ene,
9-(26-hydroxyhexacosyl)tricyclo[5.2.1.0²,⁶]dec-3-ene,
8-(30-hydroxytriacontyl)tricyclo[5.2.1.0²,⁶]dec-3-ene,
9-(30-hydroxytriacontyl)tricyclo[5.2.1.0²,⁶]dec-3-ene,
4-(2-hydroxyethyl)pentacyclo[6.5.1.1³,⁶0²,⁷0⁹,¹³]pentadec-10-ene,
5-(2-hydroxyethyl)pentacyclo[6.5.1.1³,⁶0²,⁷0⁹,¹³]pentadec-10-ene,
4-(4-hydroxybutyl)pentacyclo[6.5.1.1³,⁶0²,⁷0⁹,¹³]pentadec-10-ene,
5-(4-hydroxybutyl)pentacyclo[6.6.1.1³,⁶0²,⁷0⁹,¹³]pentadec-10-ene,
4-(6-hydroxyhexyl)pentacyclo[6.5.1.1³,⁶0²,⁷0⁹,¹³]pentadec-10-ene,
5-(6-hydroxyhexyl)pentacyclo[6.5.1.1³,⁶0²,⁷0⁹,¹³]pentadec-10-ene,
4-(8-hydroxyoctyl)pentacyclo[6.5.1.1³,⁶0²,⁷0⁹,¹³]pentadec-10-ene,
5-(8-hydroxyoctyl)pentacyclo[6.5.1.1³,⁶0²,⁷0⁹,¹³]pentadec-10-ene,
4-(10-hydroxydecyl)pentacyclo[6.5.1.1³,⁶0²,⁷0⁹,¹³]pentadec-10-ene,
5-(10-hydroxydecyl)pentacyclo[6.5.1.1³,⁶0²,⁷0⁹,¹³]pentadec-10-ene,
4-(12-hydroxydodecyl)pentacyclo[6.5.1.1³,⁶0²,⁷0⁹,¹³]pentadec-10-ene,
5-(12-hydroxydodecyl)pentacyclo[6.5.1.1³,⁶0²,⁷0⁹,¹³]pentadec-10-ene,
4-(14-hydroxytetradecyl)pentacyclo[6.5.1.1³,⁶0²,⁷0⁹,¹³]pentadec-10-ene,
5-(14-hydroxytetradecyl)pentacyclo[6.5.1.1³,⁶0²,⁷0⁹,¹³]pentadec-10-ene,
4-(16-hydroxyhexadecyl)pentacyclo[6.5.1.1³,⁶0²,⁷0⁹,¹³]pentadec-10-ene,
5-(16-hydroxyhexadecyl)pentacyclo[6.5.1.1³,⁶0²,⁷0⁹,¹³]pentadec-10-ene,
4-(18-hydroxyoctadecyl)pentacyclo[6.5.1.1³,⁶0²,⁷0⁹,¹³]pentadec-10-ene,
5-(18-hydroxyoctadecyl)pentacyclo[6.5.1.1³,⁶0²,⁷0⁹,¹³]pentadec-10-ene,
4-(22-hydroxydocosyl)pentacyclo[6.5.1.1³,⁶0²,⁷0⁹,¹³]pentadec-10-ene,
5-(22-hydroxydocosyl)pentacyclo[6.5.1.1³,⁶0²,⁷0⁹,¹³]pentadec-10-ene,
4-(26-hydroxyhexacosyl)pentacyclo[6.5.1.1³,⁶0²,⁷0⁹,¹³]pentadec-10-ene,
5-(26-hydroxyhexacosyl)pentacyclo[6.5.1.1³,⁶0²,⁷0⁹,¹³]pentadec-10-ene,
4-(30-hydroxytriacontyl)pentacyclo[6.5.1.1³,⁶0²,⁷0⁹,¹³]pentadec-10-ene,
5-(30-hydroxytriacontyl)pentacyclo[6.5.1.1³,⁶0²,⁷0⁹,¹³]pentadec-10-ene,
14-(2-hydroxyethyl)heptacyclo[9.6.1.1³,⁹1¹³,¹⁶0⁴,⁸0²,¹⁰0¹²,¹⁷]eicos-5-ene,
15-(2-hydroxyethyl)heptacyclo[9.6.1.1³,⁹1¹³,¹⁶0⁴,⁸0²,¹⁰0¹²,¹⁷]eicos-5-ene, 14-(4-hydroxybutyl)heptacyclo[9.6.1.1$^{3,9}$1$^{13,16}$0$^{4,8}$0$^{2,10}$0$^{12,17}$]eicos-5-ene,
15-(4-hydroxybutyl)heptacyclo[9.6.1.1$^{3,9}$1$^{13,16}$0$^{4,8}$0$^{2,10}$0$^{12,17}$]eicos-5-ene,
14-(6-hydroxyhexyl)heptacyclo[9.6.1.1$^{3,9}$1$^{13,16}$0$^{4,8}$0$^{2,10}$0$^{12,17}$]eicos-5-ene,
15-(6-hydroxyhexyl)heptacyclo[9.6.1.1$^{3,9}$1$^{13,16}$0$^{4,8}$0$^{2,10}$0$^{12,17}$]eicos-5-ene,
14-(8-hydroxyoctyl)heptacyclo[9.6.1.1$^{3,9}$1$^{13,16}$0$^{4,8}$0$^{2,10}$0$^{12,17}$]eicos-5-ene,
15-(8-hydroxyoctyl)heptacyclo[9.6.1.1$^{3,9}$1$^{13,16}$0$^{4,8}$0$^{2,10}$0$^{12,17}$]eicos-5-ene,
14-(10-hydroxydecyl)heptacyclo[9.6.1.1$^{3,9}$1$^{13,16}$0$^{4,8}$0$^{2,10}$0$^{12,17}$]eicos-5-ene,
15-(10-hydroxydecyl)heptacyclo[9.6.1.1$^{3,9}$1$^{13,16}$0$^{4,8}$0$^{2,10}$0$^{12,17}$]eicos-5-ene,
14-(12-hydroxydodecyl)heptacyclo[9.6.1.1$^{3,9}$1$^{13,16}$0$^{4,8}$0$^{2,10}$0$^{12,17}$]eicos-5-ene,
15-(12-hydroxydodecyl)heptacyclo[9.6.1.1$^{3,9}$1$^{13,16}$0$^{4,8}$0$^{2,10}$0$^{12,17}$]eicos-5-ene,
14-(14-hydroxytetradecyl)heptacyclo[9.6.1.1$^{3,9}$1$^{13,16}$0$^{4,8}$0$^{2,10}$0$^{12,17}$]eicos-5-ene,
15-(14-hydroxytetradecyl)heptacyclo[9.6.1.1$^{3,9}$1$^{13,16}$0$^{4,8}$0$^{2,10}$0$^{12,17}$]eicos-5-ene,
14-(16-hydroxyhexadecyl)heptacyclo[9.6.1.1$^{3,9}$1$^{13,16}$0$^{4,8}$0$^{2,10}$0$^{12,17}$]eicos-5-ene,
15-(16-hydroxyhexadecyl)heptacyclo[9.6.1.1$^{3,9}$1$^{13,16}$0$^{4,8}$0$^{2,10}$0$^{12,17}$]eicos-5-ene,
14-(18-hydroxyoctadecyl)heptacyclo[9.6.1.1$^{3,9}$1$^{13,16}$0$^{4,8}$0$^{2,10}$0$^{12,17}$]eicos-5-ene,
15-(18-hydroxyoctadecyl)heptacyclo[9.6.1.1$^{3,9}$1$^{13,16}$0$^{4,8}$0$^{2,10}$0$^{12,17}$]eicos-5-ene,
14-(22-hydroxydocosyl)heptacyclo[9.6.1.1$^{3,9}$1$^{13,16}$0$^{4,8}$0$^{2,10}$0$^{12,17}$]eicos-5-ene,
15-(22-hydroxydocosyl)heptacyclo[9.6.1.1$^{3,9}$1$^{13,16}$0$^{4,8}$0$^{2,10}$0$^{12,17}$]eicos-5-ene,
14-(26-hydroxyhexacosyl)heptacyclo[9.6.1.1$^{3,9}$1$^{13,16}$0$^{4,8}$0$^{2,10}$0$^{12,17}$]eicos-5-ene,
15-(26-hydroxyhexacosyl)heptacyclo[9.6.1.1$^{3,9}$1$^{13,16}$0$^{4,8}$0$^{2,10}$0$^{12,17}$]eicos-5-ene,
14-(30-hydroxytriacontyl)heptacyclo[9.6.1.1$^{3,9}$1$^{13,16}$0$^{4,8}$0$^{2,10}$0$^{12,17}$]eicos-5-ene,
15-(30-hydroxytriacontyl)heptacyclo[9.6.1.1$^{3,9}$1$^{13,16}$0$^{4,8}$0$^{2,10}$0$^{12,17}$]eicos-5-ene,
6-(2-hydroxyethyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(2-hydroxyethyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(4-hydroxybutyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(4-hydroxybutyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(6-hydroxyhexyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(6-hydroxyhexyl)nonacyclo[10.9.1.1$^{5,8}$1$^{3,10}$1$^{14,20}$0$^{4,9}$0$^{2,11}$0$^{13,21}$0$^{15,19}$]pentacos-16-ene, 6-(8-hydroxyoctyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(8-hydroxyoctyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(10-hydroxydecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(10-hydroxydecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(12-hydroxydodecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(12-hydroxydodecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(14-hydroxytetradecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(14-hydroxytetradecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(16-hydroxyhexadecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(16-hydroxyhexadecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(18-hydroxyoctadecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(18-hydroxyoctadecyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(22-hydroxydocosyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(22-hydroxydocosyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(26-hydroxyhexacosyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(26-hydroxyhexacosyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
6-(30-hydroxytriacontyl)nonacyclo[10.9.1.1$^{5,8}$1$^{3,10}$1$^{14,20}$0$^{4,9}$0$^{2,11}$0$^{13,21}$0$^{15,19}$]pentacos-16-ene,
7-(30-hydroxytriacontyl)nonacyclo[10.9.1.1$^{5,8}$1$^{3,10}$1$^{14,20}$0$^{4,9}$0$^{2,11}$0$^{13,21}$0$^{15,19}$]pentacos-16-ene, and the like.

The unsaturated omega-hydroxyalkylbicycloheptyl compounds produced in accordance with this invention can be employed as crosslinking agents for vinyl resins since they contain both hydroxyl and olefinically unsaturated groups. The crosslinked resins produced may be characterized by enhanced impact strength and thermal shock resistance and have a wide variety of uses, particularly as molded articles. The saturated omega-hydroxyalkylbicycloheptyl compounds produced in accordance with this invention can be employed as intermediates for detergents.

The bicycloheptylaluminum compounds obtained in accordance with Equation I can be hydrolyzed with water, dilute acid, or aqueous alcohol to produce bicycloheptyl compounds corresponding to the bicycloheptyl units of the aluminum compound, and the "grown" bicycloheptylalkylaluminum compounds obtained in accordance with Equation IV can be similarly hydrolyzed to produce alkylbicycloheptyl compounds corresponding to the bicycloheptylalkyl units of the aluminum compound. The hydrolysis reactions can be represented by the partial equations:

XIII

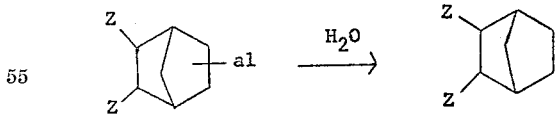

XIV

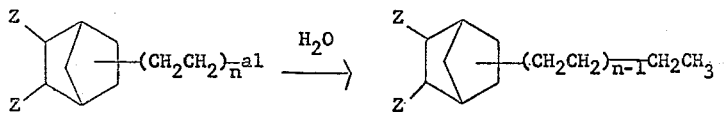

wherein Z and $n$ are as defined above.

The long chain alkylbicycloheptyl compounds produced in accordance with this invention can be converted to alkylbicycloheptyl sulfonates, which are of interest as biodegradable detergents, by conventional processes.

Various side reactions which accompany the main reactions of the instant invention also give rise to a number of useful by-products. Thus, 2-isobutylbicyclo[2.2.1]heptane can be produced in accordance with the following partial equations:

XV

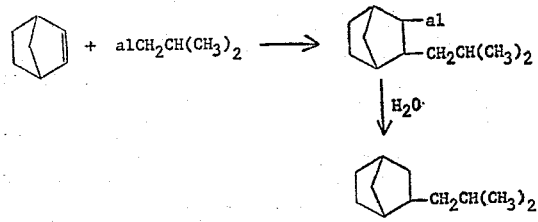

Likewise, 2,2'-binorbornane is formed by the reactions illustrated by the partial equations:

XVI

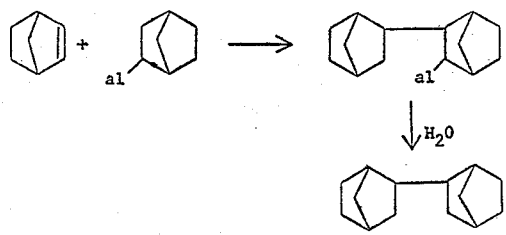

When dicyclopentadiene is employed instead of bicyclo[2.2.1]hept-2-ene, these side reactions result in the formation of 8(and 9)-isobutyltricyclo[5.2.1.0$^{2,6}$]dec-3-ene and bitricyclodencenes such as 8,8'(and 9,9')-bitricyclo[5.2.1.0$^{2,6}$]dec-3-ene in accordance with the following partial equations:

XVII

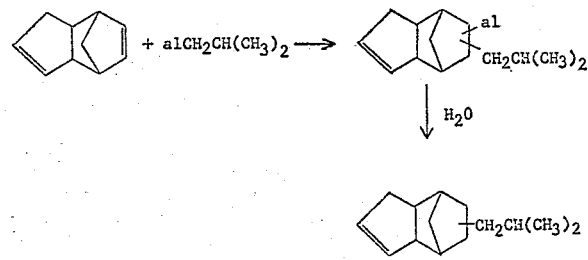

XVIII

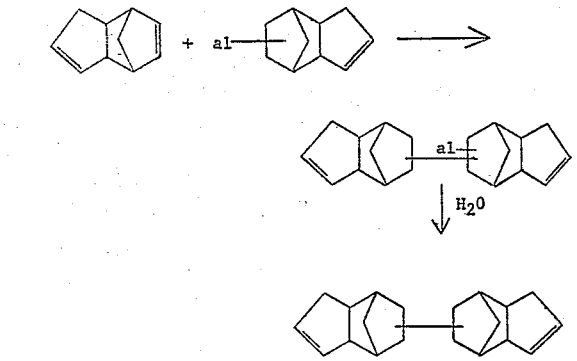

In addition to the above products, tricyclo[5.2.1.0$^{2,6}$]-decane is also produced as illustrated by the following partial equations:

XIX

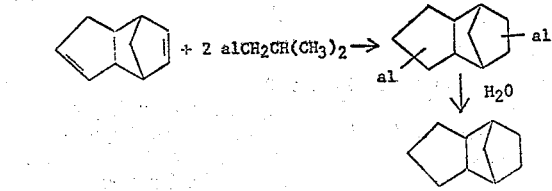

The invention can be illustrated further by the following examples, which, however, are in no way intended to limit the invention.

Example I

In a 500-milliliter flask equipped with a stirrer, thermometer, reflux condenser, jacketed dropping funnel, and attachment to a Dry Ice trap, 67 grams of bicyclo[2.2.1]-hept-2-ene (0.71 mole) were added with stirring to 47 grams of triisobutylaluminum (0.24 mole) over a period of 130 minutes, at a temperature maintained in the range of from 98° C. to 100 C. Heating and stirring were then continued at the same temperature for an additional period of five hours. During the course of the ensuing reaction, 31 grams of isobutylene (78% of the theoretical amount) were evolved and collected in the Dry Ice trap. The reaction product was hydrolyzed first with ethanol, then with water, and finally with aqueous hydrochloric acid. During this hydrolysis, 5 grams of isobutane (12%) derived from unreacted triisobutylaluminum was collected in the Dry Ice trap. The hydrolysate formed an organic upper layer and an aqueous lower layer. The layers were separated and the organic layer was dried over magnesium sulfate, filtered and distilled through a four-foot long spinning band to give the following fractions:

| Fraction | Weight (grams) | B.P. (° C.) | $C_n$ range |
|---|---|---|---|
| 1 | 26 | 97–108 | $C_7$ |
| 2 | 5 | 108–170 | $C_7$ |
| 3 | 8 | 170–190 | $C_7$, $C_{11}$ |
| 4 | 10 | 190/atm.–89°/1.5 mm. Hg | $C_{11}$, $C_{14}$ |
| Residue | 1 | | |

The first two fractions were substantially pure bicyclo[2.2.1]heptane. The third fraction was mainly 2-isobutylbicyclo[2.2.1]heptane with some bicyclo[2.2.1]heptane. The fourth fraction contained 76 percent of two binorbornane isomers in equal amounts, with the remainder of the fraction consisting mainly of 2-isobutylbicyclo[2.2.1]-heptane.

An analytically pure sample of the 2-isobutylbicyclo-[2.2.1]heptane was obtained by purification with the help of a preparative gas chromatograph (Fisher Prep/Partitioner), $n_D^{30} = 1.4534$. The infrared absorption spectrum indicated the presence of a —CH(CH$_3$)$_2$ group.

*Analysis.*—Calculated for $C_{11}H_{20}$: C, 86.76%; H, 13.24%; M.W., 152.3. Found: C, 87.28%; H, 13.14%; M.W., 152 (mass spectroscopy).

Recrystallization of a portion of fraction 4 from ethanol provided an analytically pure sample of 2,2'-binorbornane.

*Analysis.*—Calculated for $C_{14}H_{22}$: C, 88.35%; H, 11.65%; M.W., 190.3. Found: C, 88.28%; H, 11.61%; M.W., 190 (mass spectroscopy).

Example II

Four hundred and forty-six (446) grams of bicyclo-[2.2.1]hept-2-ene (4.74 moles) was reacted with 313 grams of triisobutylaluminum (1.58 moles) in a manner similar to that described in Example I and 562 grams of reaction product were recovered.

A mixture of 222 grams of this product and 424 grams of ethylene (15.1 moles) was charged to a three-liter stainless steel bomb under nitrogen. The bomb was closed and heated, accompanied by rocking, at a temperature maintained in the range of from 50° C. to 85° C. for a period of three hours, and then at a temperature maintained in the range of from 83° C. to 87° C. for seventeen hours. The pressure in the bomb dropped during this time from 1060 p.s.i. to 790 p.s.i. at 85° C. The bomb was vented after cooling, and the contents transferred under nitrogen to a glass flask. The bomb was then rinsed with some petroleum ether (B.P. 35–37° C.), which was added to the reaction product. About 90 percent of this material was hydrolyzed with ethanol and then with dilute hydrochloric acid. The hydrolysate formed an organic upper layer and an aqueous lower layer. The layers were separated and the aqueous layer was extracted with petroleum ether. The organic layers were then combined, dried over magnesium sulfate, filtered, and distilled through a four-foot spinning band to yield the following fractions after the removal of solvent:

| Fraction | Weight (grams) | B.P. (° C.) | $C_n$ range |
|---|---|---|---|
| 1 | 3 | 66–101 | $C_6C_7$ |
| 2 | 12 | 101–146 | $C_7$–$C_9$ |
| 3 | 30 | 146–185 | $C_7$–$C_{11}$ |
| 4 | 50 | 185/atm.–124/50 mm. Hg | $C_9$–$C_{11}$ |
| 5 | 65 | 124/50 mm. Hg–156/50 mm. Hg | $C_{11}$–$C_{15}$ |
| 6 | 46 | 156/50 mm. Hg–169/20 mm. Hg | $C_{13}$–$C_{17}$ |
| 7 | 17 | 169/20 mm. Hg–200/20 mm. Hg | $C_{13}$–$C_{19}$ |
| 8 | 9 | 200/20 mm. Hg–180/2 mm. Hg | $C_{15}$–$C_{23}$ |
| Residue | 2 | | |

Fractions 1 through 8 were analyzed by gas chromatography. The following amounts of hydrocarbons were obtained:

| Hydrocarbons | Weight (grams) | Yield,* percent based on bicycloheptene |
|---|---|---|
| Bicyclo[2.2.1]heptane | 6.2 | 3.7 |
| 2-ethylbicyclo[2.2.1]heptane | 28.5 | 13.5 |
| 2-butylbicyclo[2.2.1]heptane | 42.5 | 16.5 |
| 2-isobutylbicyclo[2.2.1]heptane | 31.5 | 12.2 |
| 2-hexylbicyclo[2.2.1]heptane | 38.1 | 12.4 |
| 2,2′-binorbornane | 23.3 | 14.5 |
| 2-octylbicyclo[2.2.1]heptane | 25.9 | 7.3 |
| 2-decylbicyclo[2.2.1]heptane | 12.8 | 3.2 |
| 2-dodecylbicyclo[2.2.1]heptane | 4.3 | 1.0 |
| 2-tetradecylbicyclo[2.2.1]heptane | 2.6+ | 0.5+ |
| 2-hexadecylbicyclo[2.2.1]heptane | 0.8+ | 0.15+ |
| Bicyclo[2.2.1]hept-2-ene | 2.0 | 1.2 |
| 2-vinylbicyclo[2.2.1]heptane | 2.9 | 1.4 |
| 2-(3-butenyl)bicyclo[2.2.1]heptane | 1.3 | 0.5 |
| 2-(5-hexenyl)bicyclo[2.2.1]heptane | 0.7 | 0.2 |
| 2-(7-octenyl)bicyclo[2.2.1]heptane | 0.4 | 0.1 |

*Corrected for the fact that only 90 percent of the reaction product was hydrolyzed.

Very small amounts of hexane, octane, decane, 2-methylheptane, and 2-methylnonane were also detected. Furthermore, about 3 percent of higher boiling materials ($>C_{14}$) were found.

The presence of the following compounds was determined by a comparison of their retention times in corresponding fractions with those of known compounds or compounds prepared in another way: bicyclo[2.2.1]heptane, bicyclo[2.2.1]hept-2-ene, 2-ethylbicyclo[2.2.1]heptane, 2-vinylbicyclo[2.2.1]heptane, 2-hexylbicyclo[2.2.1]heptane, 2-(5-hexenyl)bicyclo[2.2.1]heptane, and 2-dodecylbicyclo[2.2.1]heptane. The compounds used for comparison were prepared as follows: reduction of 5-vinylbicyclo[2.2.1]hept-2-ene over platinum oxide gave 2-ethylbicyclo[2.2.1]heptane, reduction over palladium on calcium carbonate gave 2-vinylbicyclo[2.2.1]heptane; reduction of 5-hexylbicyclo[2.2.1]hept-2-ene (prepared from cyclopentadiene and 1-octene) over platinum oxide afforded 2-hexylbicyclo[2.2.1]heptane; reduction of 5-(5-hexenyl)bicyclo[2.2.1]hept-2-ene (made from cyclopentadiene and 1,7-octadiene) over palladium on calcium carbonate gave mainly 2-(5-hexenyl)bicyclo[2.2.1]heptane; hydrogenation of 5-dodecylbicyclo[2.2.1]hept-2-ene (made from cyclopentadiene and 1-tetradecene) provided 2-dodecylbicyclo[2.2.1]heptane.. The Diels-Alder reactions gave rise to mixtures of exo and endo products, in which the endo product predominated. The exo and endo products had very similar retention times, although the retention time of the exo product was always slightly shorter.

Structures were assigned to the other compounds on the basis of their relative retention times.

*Example III*

Four hundred and forty-six (446) grams of bicyclo[2.2.1]hept-2-ene (4.74 moles) was reacted with 313 grams of triisobutylaluminum (1.58 moles) in a manner similar to that described in Example I and 562 grams of reaction product were recovered.

A mixture of 239 grams of this product and 419 grams of ethylene (15 moles) was charged to a three-liter stainless steel bomb under nitrogen. The bomb was closed and heated, accompanied by rocking, at a temperature maintained in the range of from 82° C. to 87° C. for a period of 17½ hours, whereupon the pressure within the bomb dropped from a high of 1530 p.s.i. to 1220 p.s.i. The bomb was vented at a temperature of 25° C., and after the addition of 150 grams of petroleum ether (B.P. 35–37° C.), 0.15 grams of nickel acetylacetonate, and 220 grams of ethylene (7.9 moles), the bomb was resealed and heated with rocking at a temperature of from 68° C. to 71° C. for 19 hours. During this time the pressure dropped from 660 p.s.i. to 480 p.s.i. The bomb was again vented after cooling, and the contents transferred under nitrogen to a glass flask and hydrolyzed with ethanol, water, and finally aqueous hydrochloric acid. The hydrolysate formed an organic upper layer and an aqueous lower layer. The layers were separated and the organic layer was washed with water, dried, filtered and distilled through a four-foot long spinning band to give the following fractions after removal of solvent:

| Fraction | Weight (grams) | B.P. (° C.) | $C_n$ range |
|---|---|---|---|
| 1 | 6 | 67–106 | $C_6$–$C_7$ |
| 2 | 11 | 106–146 | $C_7$–$C_9$ |
| 3 | 104 | 146–180 | $C_9$–$C_{11}$ |
| 4 | 22 | 180/atm.–128/50 mm. Hg | $C_{11}$–$C_{13}$ |
| 5 | 46 | 128/50 mm.–156/50 mm. Hg | $C_{11}$–$C_{15}$ |
| 6 | 65 | 156/50 mm.–170/50 mm. Hg | $C_{13}$–$C_{15}$ |
| 7 | 20 | 170/50 mm.–200/50 mm. Hg | $C_{14}$–$C_{17}$ |
| 8 | 16 | 200/50 mm.–184/0.75 mm. Hg | $C_{17}$–$C_{23}$ |
| Residue | 4 | | |

Fractions 1 through 8 were analyzed by gas chromatography. The following amounts of hydrocarbons were obtained:

| Hydrocarbons | Weight (grams) | Yield, percent based on bicycloheptene |
|---|---|---|
| Bicyclo[2.2.1]hept-2-ene | 4.8 | 2.5 |
| 2-vinylbicyclo[2.2.1]heptane | 38.8 | 15.8 |
| 2-(3-butenyl)bicyclo[2.2.1]heptane | 33.5 | 11.1 |
| 2-isobutylbicyclo[2.2.1]hept-2-ene | 26.9 | 8.9 |
| 2-(5-hexenyl)bicyclo[2.2.1]heptane | 34.0 | 9.5 |
| 2-(7-octenyl)bicyclo[2.2.1]heptane | 31.9 | 7.7 |
| 2-(9-decenyl)bicyclo[2.2.1]heptane | 13.7 | 2.9 |
| 2-(11-dodecenyl)bicyclo[2.2.1]heptane | 4.9 | 0.9 |
| 2-(13-tetradecenyl)bicyclo[2.2.1]heptane | 4.0 | 0.7 |
| 2-(15-hexadecenyl)bicyclo[2.2.1]heptane | 0.4+ | 0.06+ |
| 2-ethylbicyclo[2.2.1]heptane | 8.6 | 3.4 |
| 2-butylbicyclo[2.2.1]heptane | 4.3 | 1.4 |
| 2-isobutylbicyclo[2.2.1]heptane | 9.5 | 3.1 |
| 2-hexylbicyclo[2.2.1]heptane | 7.5 | 2.1 |
| 2,2′-binorbornane | 29.6 | 7.7 |
| 2-octylbicyclo[2.2.1]heptane | 4.5 | 1.1 |
| 2-decylbicyclo[2.2.1]heptane | 1.5 | 0.3 |
| 2-dodecylbicyclo[2.2.1]heptane | 0.9 | 0.17 |
| 2-tetradecylbicyclo[2.2.1]heptane | 0.25 | 0.04 |

The 2-isobutylbicyclo[2.2.1]hept-2-ene was purified by preparative gas chromatography on a Fisher Prep/Partitioner. The infrared absorption spectrum indicated the presence of a —CH(CH$_3$)$_2$ group, and confirmed the presence of a trisubstituted ethylene of the bicycloheptene type.

*Analysis.*—Calculated for $C_{11}H_{18}$: C, 87.92%; H, 12.08%; M.W., 150.3. Found: C, 87.94%; H, 11.77%; M.W., 150 (mass spectroscopy).

*Example IV*

In a three-liter flask equipped with a stirrer, thermometer, reflux condenser, jacketed dropping funnel, and attachment to a Dry Ice trap, 660 grams of endo-dicyclopentadiene (5 moles) were added with stirring to 332 grams of triisobutylaluminum (1.67 moles) over a period of nine hours, at a temperature maintained in the range of from 95° C. to 97° C. Heating and stirring were then continued at a temperature of from 96° C. to 105° C. for an additional period of eight hours. During the course of the ensuing reaction, 225 grams of isobutylene (80% of the theoretical amount) were evolved and collected in the Dry Ice trap. A 268 gram portion of the reaction product was hydrolyzed first with ethanol, then with water, and finally with aqueous hydrochloric acid. During this hydrolysis, isobutane derived from unreacted triisobutylaluminum was collected in the Dry Ice trap. The hydrolysate formed an organic upper layer and an aqueous lower layer. The layers were separated and the aqueous layer was extracted with petroleum ether. The organic layers were then combined, dried over magnesium sulfate, filtered and distilled through a three-foot long spinning band to give the following fractions:

| Fraction | Weight (grams) | B.P. (° C.) | $C_n$ range |
|---|---|---|---|
| 1 | 144 | Up to 104/100 mm. Hg | $C_6, C_{10}$ |
| 2 | 149 | 104/100 mm.–80/20 mm. Hg | $C_{10}$ |
| 3 | 9 | 80/20 mm.–100/10 mm. Hg | $C_{10}, C_{14}$ |
| 4 | 22 | 100/10 mm.–130/0.5 mm. Hg | $C_{10}, C_{14}$ |
| 5* | 32 | 145/1 mm.–155/0.5 mm. Hg | $C_{20}$ |
| Residue | 5 | | |

*Fraction 5 was distilled without rectification.

Fraction 5 contained mostly petroleum ether and 7.6 grams of tricyclo[5.2.1.0$^{2,6}$]dec-3-ene. Fractions 1 through 4 were analyzed by gas chromatography. The following amounts of hydrocarbons were obtained:

| Hydrocarbons | Weight (grams) | Yield, percent based on dicyclopentadiene |
|---|---|---|
| Tricyclo[5.2.1.0$^{2,6}$] dec-3-ene | 155.6 | 67.5 |
| Dicyclopentadiene | 2.9 | 1.3 |
| Tricyclo[5.2.1.0$^{2,6}$]decane | 3.4 | 1.5 |
| 8(and 9)-isobutyltricyclo-[5.2.1.0$^{2,6}$]dec-3-ene a | 25.8 | 10.1 |
| Bitricyclodecene a | 32 | 14.0 | a Consisted of several isomers.

The presence of tricyclo[5.2.1.0$^{2,6}$]dec-3-ene, tricyclo[5.2.1.0$^{2,6}$]decane, and dicyclopentadiene was determined by a comparison of their retention times in corresponding fractions with those of known compounds or compounds prepared in another way. The compounds used for comparison were prepared as follows: reduction of dicyclopentadiene over platinum oxide yielded tricyclo[5.2.1.0$^{2,6}$]decane, hydrogenation over palladium on calcium carbonate afforded tricyclo[5.2.1.0$^{2,6}$]dec-3-ene.

The isobutyltricyclo[5.2.1.0$^{2,6}$]dec - 3 - enes were isolated as a mixtures of two isomers from a corresponding fraction in Example V by preparative gas chromatography on a Fisher Prep/Partitioner. The infrared absorption spectrum indicated the presence of —CH(CH$_3$)$_2$ groups, and cis RCH=CHR' groups.

*Analysis.*—Calculated for C$_{14}$H$_{22}$: C, 88.35%; H, 11.65%; M.W. and hydrogen number, 190.3. Found: C, 88.63%; H, 11.50%; hydrogen number, 191.3; M.W., 190 (mass spectroscopy).

An analytically pure sample of the bitricyclodecenes was obtained by recrystallization from butanol. The white purified sample (3 g.) melted at 165–167° C. The infrared spectrum was in agreement with the assigned structure.

*Analysis.*—Calculated for C$_{20}$H$_{26}$: C, 90.16%; H, 9.84%; M.W., 266. Found: C, 90.24%; H, 9.75%; M.W., 262±2 percent (boiling point method).

*Example V*

A mixture of 200 grams of the reaction product obtained as described in Example IV and 260 grams of ethylene (9.3 moles) was charged to a stainless steel bomb under nitrogen. The bomb was closed and heated, accompanied by rocking, at a temperature maintained in the range of from 82° C. to 87° C. for a period of twenty-one hours. The pressure in the bomb dropped during this time from 1030 p.s.i. to 675 p.s.i. The bomb was vented after cooling, and after dilution with petroleum ether (B.P. 35–39° C.), the contents of the bomb was transferred under nitrogen to a glass flask and hydrolyzed with ethanol, water, and finally with aqueous hydrochloric acid. The hydrolysate formed an organic upper layer and an aqueous lower layer. The layers were separated and the organic layer was washed with water, dried over magnesium sulfate, filtered and distilled through a four-foot long spinning band to give the following fractions after the removal of solvent:

| Fraction | Weight (grams) | B.P. (° C.) | $C_n$ range |
|---|---|---|---|
| 1 | 4 | 160–200 | $C_8$–$C_{10}$ |
| 2 | 20 | 200–210 | $C_{10}$–$C_{14}$ |
| 3 | 63 | 210/atm.–150/47 mm. Hg | $C_{10}$–$C_{14}$ |
| 4 | 63 | 150/47 mm.–150/10 mm. Hg | $C_{12}$–$C_{16}$ |
| 5 | 18 | 150/10 mm.–172/5 mm. Hg | $C_{14}$–$C_{20}$ |
| 6 | 27 | 172/5 mm.–187/1 mm. Hg | $C_{18}$–$C_{22}$ |
| 7 | 7 | 187/1 mm.–192/1 mm. Hg | $C_{20}$–$C_{26}$ |
| Residue | 6 | | |

Fractions 1 through 8 were analyzed by gas chromatography. The following amounts of hydrocarbons were obtained.

| Hydrocarbons | Weight (grams) | Yield, percent based on initial dicyclopentadiene |
|---|---|---|
| Tricyclo[5.2.1.0$^{2,6}$]dec-3-ene | 17.8 | 10.3 |
| 8(and 9)-ethyltricyclo[5.2.1.0$^{2,6}$]dec-3-ene a | 40.9 | 19.6 |
| 8(and 9)-butyltricyclo[5.2.1.0$^{2,6}$]dec-3-ene a | 36.0 | 14.7 |
| 8(and 9)-isobutyltricyclo-[5.2.1.0$^{2,6}$]dec-3-ene b | 21.8 | 8.9 |
| 8(and 9)-hexyltricyclo[5.2.1.0$^{2,6}$]dec-3-ene a | 23.7 | 8.4 |
| 8(and 9)-octyltricyclo[5.2.1.0$^{2,6}$]dec-3-ene a | 12.8 | 4.0 |
| 8(and 9)-decyltricyclo[5.2.1.0$^{2,6}$]dec-3-ene a | 2.5 | 0.7 |
| Bitricyclodecene c | 23.4 | 12.8 |
| 8(and 9)-vinyltricyclo[5.2.1.0$^{2,6}$]dec-3-ene a | 3.6 | 1.7 |
| 8(and 9)-(3-butenyl)tricyclo-[5.2.1.0$^{2,6}$]dec-3-ene a | ~1.2 | ~0.5 | a The two isomers were detected in the approximate ratio of 3:2 in the order of increasing retention times.
b The two isomers were detected in the approximate ratio of 1:2 in the order of increasing retention times.
c Consisted of several isomers whose peaks were overlapping.

About 5–7 percent of $C_{22}$, $C_{24}$, and $C_{26}$ hydrocarbons were found in fractions 6 and 7.

An analytically pure sample of 8(and 9)-ethyltricyclo-[5.2.1.0$^{2,6}$]dec-3-ene was obtained by preparative gas chromatography on a Fisher Prep/Partitioner, $n_D^{25}$ 1.4961, $d_4^{25}$ 0.941. Its infrared spectrum confirmed the assigned structure.

*Analyses.*—Calculated for C$_{12}$H$_{18}$: C, 88.82%; H, 11.18%; M.W. and hydrogen number, 162.3; M$_D$, 50.57. Found: C, 89.08%; H, 10.77%; hydrogen number, 156; M.W., 162 (mass spectroscopy); M$_D$, 50.4.

An analytically pure sample of 8(and 9)-butyltricyclo-[5.2.1.0$^{2,6}$]dec-3-ene was also obtained by preparative gas chromatography in the above manner. Inspection of its infrared spectrum did not indicate the presence of —CH(CH$_3$)$_2$ groups as in the case of 8(and 9)-isobutyltricyclo[5.2.1.0$^{2,6}$]dec-3-ene (see Example IV).

*Analysis.*—Calculated for C$_{14}$H$_{22}$: M.W. and hydrogen number, 190.3. Found: M.W., 190 (mass spectroscopy); hydrogen number, 186.1.

*Example VI*

A mixture of 174 grams of the reaction product obtained as described in Example IV and 276 grams of ethylene (9.85 moles) was charged to a stainless steel bomb under nitrogen. The bomb was closed and heated, accompanied by rocking, at a temperature maintained in the range of from 82° C. to 85° C. for a period of sixteen and one-half hours. The pressure in the bomb dropped during this time from 1140 p.s.i. to 980 p.s.i. The bomb was vented after cooling, and after the addition of 200 grams of benzene, 0.1 gram of nickel acetylacetonate, and 265 grams of ethylene (9.5 moles), the bomb was resealed and heated with rocking at a temperature of about 70° C. for 24 hours. During this time the pressure dropped from 810 p.s.i. to 710 p.s.i. The bomb was again vented after cooling, and the contents transferred under nitrogen to a glass flask and hydrolyzed with ethanol, water, and finally with aqueous hydrochloric acid. The hydrolysate formed an organic upper layer and an aqueous lower layer. The layers were separated and the organic layer was washed with water, dried, filtered and distilled through a four-foot long spinning band to give the following fractions after removal of solvent, in addition to small amounts of other low-boiling materials:

| Fraction | Weight (grams) | B.P. (° C.) | $C_n$ range |
|---|---|---|---|
| 1 | 13 | 94/50 mm. Hg–110/50 mm. Hg | $C_{10}$–$C_{12}$ |
| 2 | 58 | 110/50 mm. Hg–150/50 mm. Hg | $C_{10}$–$C_{14}$ |
| 3 | 37 | 150/50 mm. Hg–175/50 mm. Hg | $C_{12}$–$C_{14}$ |
| 4 | 19 | 140/10 mm. Hg–168/10 mm. Hg | $C_{14}$–$C_{16}$ |

A mixture comprised predominantly of 8(and 9)-vinyltricyclo[5.2.1.0$^{2,6}$]-dec-3-ene was isolated by fractional distillation (B.P. 85° C./10 mm. Hg–57° C./1.7 mm. Hg). To 795 grams of this mixture, 2658 grams of a 25.2 percent solution of peracetic acid in ethyl acrylate were added dropwise with stirring over a period of four hours and five minutes at a temperature of 50° C. Stirring was then continued at a temperature of 50° C. for an additional period of five hours and ten minutes until 99.4 percent of the theoretical amount of peracetic acid had been consumed. Low boiling material present was thereafter removed by co-distillation with 2560 grams of ethylbenzene. The residue was then combined with the residue from a similar run of the same size which had been carried to 98.2 percent completion with peracetic acid and co-distilled with ethylbenzene. The combined residues were then distilled through a 30-inch long column to give 619 grams of a colorless liquid boiling at a temperature of 84° C./1.8 mm. Hg–89° C./1.6 mm. Hg ($n_D^{30}$ 1.4974), which consisted of substantially pure 3,4-epoxy-8(and 9) ethyltricyclo[5.2.1.0$^{2,6}$]decane (indicated purity of 99.5 percent by hydrogen bromide-dioxane epoxide analysis). After distillation of 131 grams of mid cuts, 1008 grams of a colorless liquid boiling at a temperature of 116° C./1.25 mm. Hg–126° C./1.5 mm. Hg ($n_D^{30}$ 1.5142) was obtained which consisted of substantially pure 3,4-epoxy-8(and 9)-epoxyethyltricyclo[5.2.1.0$^{2,6}$]decane (indicated purity of 97.8 percent by hydrogen bromide-dioxane epoxide analysis).

*Analysis.*—Calculated for $C_{12}H_{16}O_2$: C, 74.97%; H, 8.39%. Found: C, 75.16%; H, 8.28%.

Example VII

A mixture comprised predominantly of 8(and 9)-(3-butenyl)tricyclo[5.2.1.0$^{2,6}$]dec-3-ene was obtained as described in Example VI and isolated by fractional distillation (B.P. 56.5° C./0.35 mm. Hg–63° C./0.45 mm. Hg). To 800 grams of this mixture, 2485 grams of a 25.2 percent solution of peracetic acid in ethyl acrylate were added dropwise with stirring over a period of three hours and fifteen minutes at a temperature of 50° C. Stirring was then continued at a temperature of 50° C. for an additional period of five hours and forty-five minutes until 100.1 percent of the theoretical amount of peracetic acid had been consumed. Low boiling material present was thereafter removed by co-distillation with 1500 grams of ethylbenzene. The residue was then distilled through a 36-inch long column to give at first lower-boiling monoepoxides and then 482 grams of a colorless liquid boiling at a temperature of 125–127° C./0.6 mm. Hg ($n_D^{30}$ 1.5068), which consisted of substantially pure 3,4-epoxy-8 (and 9) - (3,4 - epoxybutyl)tricyclo[5.2.1.0$^{2,6}$]decane indicated purity of 97.3 percent of hydrogen bromide-dioxane epoxide analysis).

*Analysis.*—Calculated for $C_{14}H_{22}O_2$: C, 76.32%; H, 9.15%. Found: C, 76.18%; H, 8.90%.

Example VIII

A mixture of 400 grams of 3,4-epoxy-8 (and 9)-epoxyethyltricyclo[5.2.1.0$^{2,6}$]decane obtained as described in Example VI, 300 grams of ethanol solvent, and 20 grams of wet Raney nickel catalyst was hydrogenated in a 3-liter stainless steel rocker bomb at a temperature of from 142° C. to 150° C. over a period of twenty minutes, during which time the pressure within the bomb dropped from a high of 1500 p.s.i. to 575 p.s.i. The pressure was then brought back to 1500 p.s.i. and hydrogenation was continued at the same temperature for an additional three hours, during which time the pressure dropped from 1500 p.s.i. to 1400 p.s.i. Upon removal of the catalyst by filtration and the solvent by distillation, 398 grams of substantially pure 8 (and 9) - (2 - hydroxyethyl)tricyclo-[5.2.1.0$^{2,6}$]decan-3 (and 4)-ol were obtained as a viscous residue (indicated purity 89.8 percent by phthalic anhydride-pyridine hydroxyl analysis).

*Analysis.*—Calculated for $C_{12}H_{20}O_2$: C, 73.43%; H, 10.27%. Found: C, 74.36%; H, 10.44%.

Example IX

A mixture of 250 grams of 3,4-epoxy-8 (and 9)-(3,4-epoxybutyl)tricyclo[5.2.1.0$^{2,6}$]decane obtained as described in Example VII, 250 grams of ethanol, and 12.5 grams of wet Raney nickel catalyst was hydrogenated in a 3-liter stainless steel rocker bomb at a temperature of from 145° C. to 154° C. over a period of three hours and twenty minutes, during which time the pressure within the bomb dropped from a high of 1500 p.s.i. to 900 p.s.i. Upon removal of the catalyst by filtration and the solvent by distillation, 248 grams of substantially pure 8 (and 9)-(4-hydroxybutyl)tricyclo[5.2.1.0$^{2,6}$]decan-3 (and 4) - ol were obtained as a viscous residue (indicated purity 92.8 percent by phthalic anhydride-pyridine hydroxyl analysis).

What is claimed is:
1. The process for the production of high molecular weight alkenylbicycloheptyl compounds of the formula:

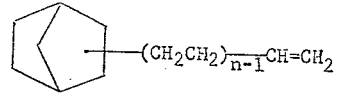

wherein $n$ is an integer of from 1 to 16, which process comprises the steps of (a) bringing a bicycloheptene compound of the formula:

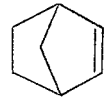

into reactive admixture with an isoalkylaluminum compound of the formula selected from the group:

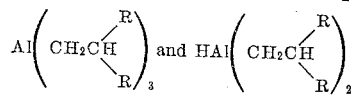

wherein each R, independently, designates an alkyl radical of from 1 to 4 carbon atoms, at a temperature of from about 70° C. to about 200° C., for a period of time sufficient to produce a bicycloheptylaluminum compound containing bicycloheptylaluminum units of the formula:

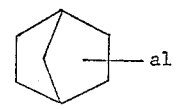

(b) bringing said bicycloheptylaluminum compound into reactive admixture with at least one mole of ethylene per bicycloheptylaluminum unit thereof, in the absence of a catalyst, at a temperature of from about 70° C. to about 200° C., for a period of time sufficient to produce an ethylenically grown bicycloheptylalkylaluminum compound containing bicycloheptylalkylaluminum units of the formula:

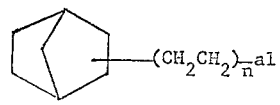

wherein $n$ is as defined above, and (c) bringing said ethylenically grown bicycloheptylalkylaluminum compound into reactive admixture with at least one mole of ethylene per bicycloheptylalkylaluminum unit thereof, at a temperature of from about 25° C. to about 350° C. and in contact with an alumnium displacement catalyst when said temperature is in the range of from about 25° C. to about 200° C., for a period of time sufficient to produce said high molecular weight alkenylbicycloheptyl compound.

2. A process as in claim 1 wherein the temperature in (a) ranges from about 90° C. to about 160° C., the temperature in (b) ranges from about 80° C. to about 120° C., and the temperature in (c) ranges from about 40° C. to about 90° C. and an aluminum displacement catalyst is employed which is nickel acetylacetonate.

3. The process according to claim 2 wherein the isoalkylaluminum compound is triisobutylaluminum.

4. The process according to claim 2 wherein the isoalkylaluminum compound is diisobutylaluminum hydride.

5. The process according to claim 2 wherein the bicycloheptene compound employed as an initial reactant is bicyclo[2.2.1]hept-2-ene.

6. The porcess for the production of an ethylenically grown bicycloheptylalkylaluminum compound containing bicycloheptylalkylaluminum units of the formula:

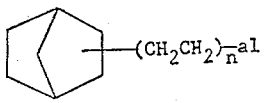

wherein $n$ is an integer of from 1 to 16, which process comprises the steps of (a) bringing a bicycloheptene compound of the formula:

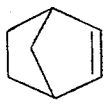

into reactive admixture with an isoalkylaluminum compound of the formula selected from the group:

$$Al(CH_2\overset{R}{\underset{R}{C}H})_3 \text{ and } HAl(CH_2\overset{R}{\underset{R}{C}H})_2$$

wherein each R, independently, designates an alkyl radical of from 1 to 4 carbon atoms, at a temperature of from about 70° C. to about 200° C., for a period of time sufficient to produce a bicycloheptylaluminum compound containing bicycloheptylaluminum units of the formula:

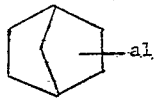

and (b) bringing said bicycloheptylaluminum compound into reactive admixture with at least one mole of ethylene per bicycloheptylaluminum unit thereof, in the absence of a catalyst, at a temperature of from about 70° C. to about 200° C., for a period of time sufficient to produce said ethylenically grown bicycloheptylalkylaluminum compound.

7. A process as in claim 1 wherein the temperature in (a) ranges from about 90° C. to about 160° C., and the temperature in (b) ranges from about 80° C. to about 120° C.

8. The process according to claim 7 wherein the isoalkylaluminum compound is triisobutylaluminum.

9. The process according to claim 7 wherein the isoalkylaluminum compound is diisobutylaluminum hydride.

10. The process according to claim 7 wherein the bicycloheptene compound employed as an initial reactant is bicyclo[2.2.1]hept-2-ene.

11. The alkenylbicycloheptyl compounds of the formula:

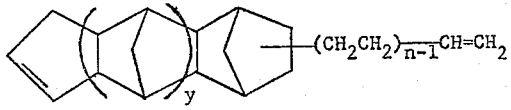

wherein $n$ is an integer of from 1 to 16 and $y$ is an integer of from 0 to 3.

12. The compounds as in claim 11 wherein $y$ is 0.

13. A compound as in claim 12 wherein the compound is 8-vinyltricyclo[5.2.1.0$^{2,6}$]dec-3-ene.

14. A compound as in claim 12 wherein the compound is 9-vinyltricyclo[5.2.1.0$^{2,6}$]dec-3-ene.

15. A compound as in claim 12 wherein the compound is 8-(3-butenyl)tricyclo[5.2.1.0$^{2,6}$]dec-3-ene.

16. A compound as in claim 12 wherein the compound is 9-(3-butenyl)tricyclo[5.2.1.0$^{2,6}$]dec-3-ene.

References Cited

UNITED STATES PATENTS

| | | | |
|---|---|---|---|
| 2,699,457 | 1/1955 | Ziegler et al. | 260—683.15 |
| 2,781,410 | 2/1957 | Ziegler et al. | 260—683.15 |
| 2,826,598 | 3/1958 | Ziegler et al. | 260—448 |
| 2,863,896 | 12/1958 | Johnson | 260—683.15 |
| 3,210,379 | 10/1965 | Porret | 260—340.7 |
| 3,211,750 | 10/1965 | Batzer et al. | 260—340.7 |
| 3,211,751 | 10/1965 | Batzer et al. | 260—340.7 |
| 3,213,111 | 10/1965 | Batzer et al. | 260—340.7 |
| 3,226,401 | 12/1965 | Tinsley | 260—340.6 |
| 3,230,202 | 1/1966 | Tinsley et al. | 260—78.5 |
| 3,231,586 | 1/1966 | Tinsley | 260—340.6 |

OTHER REFERENCES

Harry Teckleaburg et al.: Polymerization and Polycondensation Processes, Advances in Chemistry Series 34, Am. Chem. Soc., 1962, pp. 145–156.

Paul D. Bartlett et al.: J. Am. Chem. Soc., 68, 6–8, 1946.

Herman Alexander Bruson et al.: J. Am. Chem. Soc., 68, 8–10, 1946.

DELBERT E. GANTZ, *Primary Examiner.*

V. O'KEEFE, *Assistant Examiner.*